UNITED STATES PATENT OFFICE.

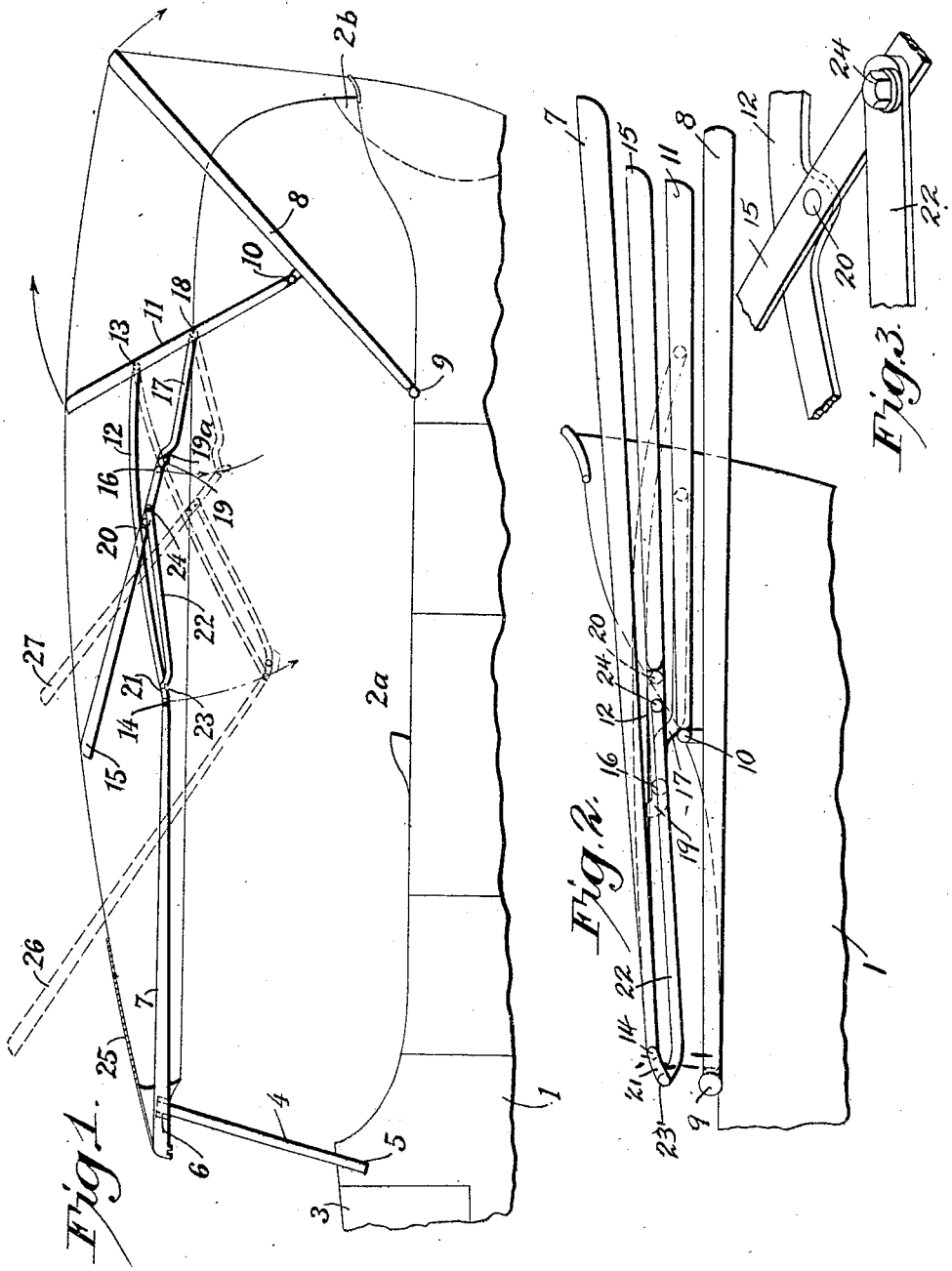

CARL E. E. WOLFERMANN, OF NEW YORK, N. Y.

AUTOMOBILE-TOP.

1,364,671.  Specification of Letters Patent.  Patented Jan. 4, 1921.

Application filed July 23, 1919. Serial No. 312,712.

*To all whom it may concern:*

Be it known that I, CARL E. E. WOLFERMANN, a citizen of the Republic of Germany, and resident of New York, county and State of New York, have invented certain new and useful Improvements in Automobile-Tops, of which the following is a specification.

My invention relates to tops for vehicles, especially automobiles, and the principal object of same is to provide means by which the top may be easily lifted and spread, as well as folded and lowered in one single operation.

Other objects and advantages will hereinafter be referred to and more particularly pointed out in the specification and claims.

In the accompanying drawings, which illustrate one way of carrying out the invention, Figure 1 is a side elevation of an automobile body carrying my new top, certain parts of the roof cloth being broken away so as to disclose the features of my invention. This figure also shows in dashed lines the top in a semifolded condition. Fig. 2 is a side elevation of the automobile body showing the top resting in folded condition upon the body of the automobile. Fig. 3 is a detail perspective view of the connection between the links and the intermediate arch.

Before entering into a more detailed description of my invention I beg to state that the automobile body *per se* does not form part of my invention but that same may be combined with any automobile representing either of the many variations of constructions found on the market.

Furthermore, inasmuch as the arrangement of all parts of the top is the same on either side of the body and as the drawings give only a view of one side of same I shall refer in the further description only to the location and arrangement of said parts on this one side for it will be easily understood when and where both sides are connected by certain parts of the device, for instance by certain U-shaped arches.

Referring to the accompanying drawings, in which similar numerals indicate similar parts throughout the several views, 1 indicates an automobile body having front and rear seats $2^a$ and $2^b$ respectively. Between the hood 3 and the front seat $2^a$ a windshield 4 is hingedly or rigidly arranged at 5 upon the body 1. The upper end or rim of the windshield is arranged that its left and right corner slide tightly into sockets 6 provided on the inside of the substantially U-shaped front arch 7.

A rear arch 8 is hingedly connected at 9 to body 1 near rear seat $2^b$ and is provided somewhat below its middle with a short side arm 10, at the end of which the U-shaped arch 11 is also hingedly connected; this arch 11 is obviously shorter than arch 8. The rod 12, forming the rear member of front arch 7, is hingedly connected with arch 11 near its top at 13; it is of considerable length and stretches far out to connect hingedly at 14 with arch 7. The arch formed by arch 7 and rods 12, and connecting hingedly at 13 with arch 11, is therefore not rigid in its entirety, but may be folded owing to the hinged connection at 14. There is furthermore the intermediate folding arch 15 formed by the U-shaped arch 11 and the bayonet shaped rods 17 hingedly connected at 16; by means of these rods 17 arch 15 is connected with arch 11 at 18, approximately the middle of the side-arms of arch 11. It will be noticed that arch 15 has an extension 19 going only a short distance beyond 16; this extension 19 is either twisted or bent at its free end so as to form a catch $19^a$ which strikes against the lower side of the bayonet shaped end of rod 17.

It is obvious from the drawings that rod 12 and arch 15 cross each other at approximately the middle of the former and that they are hingedly connected with each other below the crossing point at 20, as shown in detail by Fig. 3.

It will be further noticed from the drawings that arch 7 extends a short distance beyond 14 and that this extension 21, arch 7 being itself in a horizontal position, has an upward direction. An actuating rod 22 is ascending toward main arch 11 and is hingedly connected with front arch 7 and intermediate arch 15 at the end 23 of the extension 21 and at 24, respectively.

The roof-cloth 25 is spread over and secured in any of the well known ways to the frame formed by the various arches and rods, and stretched by the pressure exerted by these elements so as to preserve the graceful lines of the automobile.

The working of my new automobile top is illustrated the best by describing the functions performed by its various elements when the top is spread in its full length over the automobile body and their action when the top is to be lowered into the position indicated by Fig. 2.

It is obvious that the arch 8 and windshield 4 support the frame work forming the upper part of the top and that the former carries the arch 11 with which all the other elements of the top are connected in a more or less direct way. Arches 8 and 11 are each made of one piece, whereas each of arches 7 and 15 consist of several parts; the parts of each of these latter arches interact between each other as members of the same element. Both arches 7 and 15, however, also interact between each other owing to their hinged connection at 20, and also because rod 22 by its hinged connections at 23 and 24, together with its curved end at connection 23 exerts an important action upon arch 15.

Furthermore, besides the support given by windshield 4 and arch 8 to the top, the catch 19ª at the end of the extension 19 conveys great stability to the top because it prevents arch 15 from falling below a certain height. The stability of the framework is furthermore enhanced by the hinged connection between arch 15 and rod 12 at 20. Finally rod 22 makes the framework rather rigid because it acts as a mutual and powerful brace for and between arches 7 and 15.

If one desires to fold the top to lower it into the position indicated by Fig. 2, one lifts arch 7 from the windshield 4 and pushes it toward the rear seat 2ᵇ into the position indicated by dashed lines 26. The result thereof is that the short extension 21 of arch 7 pierces at hinge 23 upon rod 22 in a downward direction. This pressure is immediately transferred and extended upon the lower part of arch 15 at hinge 24. As soon as this pressure acts on the various parts referred to 15 moves upward into position 27 indicated by dashed lines and the two hinges 14 and 16 move downward, the other hinges 23, 20 and 24 of the foldable frame following in the same direction. A further consequence caused by the folding of the top is the moving of the center of gravity of the top toward arch 8 so that the top may be gently lowered to finally rest upon body 1 as indicated in Fig. 2. If the top is to be raised one simply lifts the middle part of arch 7 and pulls it toward the windshield until the latter can be inserted into the sockets 6. Arch 7 cannot fall appreciably below the height of the upper rim of the windshield 4, because roof cloth 25 and the connecting rod 22, though not directly connected with each other, act to accomplish this effect. Said roof cloth 25 keeps both arches 8 and 11 at certain positions and as arches 7 and 15 are hingedly connected with each other at 20 below approximately the middle of arm 12 of the former, it stands to reason that the rod 22, owing to its hinged connection with arch 15 at 24, stops the foremost point of arch 7 from falling below the indicated line by driving catch 19ª against the bayonet arm 17 of arch 15, thereby straightening out or stiffening the whole arch 15 and arresting the front member of arch 7 that it cannot fall below the height referred to. The operator has never to fear that the top with its full weight will fall down upon him; on the contrary once he has moved the top that arch 7 has passed over the rear seat the operation is accomplished with both ease and convenience.

What I claim is:

1. In a top for vehicles, a frame comprising a rigid rear arch, a rigid main arch, a foldable front arch and a foldable intermediate arch hingedly connected with said main arch, the folding arches crossing and being in hinged connection with each other, and an actuating rod hingedly connecting the folding arches below the crossing point.

2. In a top for vehicles, a frame comprising a rigid rear arch, a rigid main arch, a foldable front arch and a foldable intermediate arch hingedly connected with said main arch, the folding arches crossing and being in hinged connection with each other at substantially the point of crossing, and an actuating rod hingedly connecting the folding arches below their crossing point.

3. In a top for vehicles, a frame comprising a rigid rear arch, a rigid main arch, a foldable front arch and a foldable intermediate arch hingedly connected with said main arch, the folding arches crossing and being in hinged connection with each other at substantially the point of crossing, and an actuating rod connecting the folding arches below their hinged connection with each other.

4. In a top for vehicles, a frame comprising a rigid rear arch, a rigid main arch, hingedly connected to the former, a foldable front arch and a foldable intermediate arch hingedly connected with said main arch, the intermediate arch crossing with its front member the rear member of the front arch and being hingedly connected thereto below said crossing point, and an actuating rod hingedly connecting the folding arches below the hinged connection with each other.

5. In a top for vehicles, a frame comprising a rigid rear arch, a rigid main arch hingedly connected to the former, a foldable front arch and a foldable intermediate arch hingedly connected with said main arch, the intermediate arch crossing with its front member the front arch at approximately the middle of its rear member and being hingedly connected thereto below said crossing point, and an actuating rod hingedly connecting the folding arches below the hinged connection with each other.

6. In a top for vehicles, a frame comprising a rigid rear arch, a rigid main arch hingedly connected to the former, a foldable front arch hingedly connected to and projecting in a forward direction from near the top of the main arch, a foldable intermediate arch hingedly connected to and projecting from the main arch at a point below the starting point of the front arch, the front member of the intermediate arch crossing the rear member of the front arch and being hingedly connected thereto below the crossing point, and an actuating rod hingedly connecting the folding arches below the hinged connection with each other.

7. In a top for vehicles, a frame comprising a rigid rear arch, a rigid main arch hingedly connected to the former, a foldable front arch hingedly connected to and projecting in a forward direction from near the top of the main arch, a foldable intermediate arch hingedly connected to and projecting from the main arch at a point below the starting point of the front arch, the front member of the intermediate arch crossing the rear member of the front arch and being hingedly connected thereto below the crossing point, and an actuating rod hingedly connecting the rearward extension of the front member of the front arch with the front member of the intermediate arch below the hinged connection of the folding arches.

8. In a top for vehicles, a frame embodying a foldable front arch and a foldable intermediate arch, the latter crossing with its front member the rear member of the former and being in hinged connection with each other below the crossing point, and an actuating rod hingedly connected to the front member of the folding front arch and the front member of the folding intermediate arch at points located below the hinged connection of the folding arches, said actuating rod being adapted to transfer any pressure exerted by the front arch to the intermediate arch for the purpose of folding or raising the top.

9. In a top for vehicles, a frame embodying an actuating rod hingedly connected to the front member of the folding front arch and the front member of the folding intermediate arch at points located below the hinged connection between the folding arches, said actuating rod being adapted to transfer any pressure exerted by the front arch to the intermediate arch for the purpose of folding or raising the top.

10. As an article of manufacture, a foldable automobile top adapted to be attached to automobiles and partly supported thereon by the windshield, the top comprising a rigid and substantially U-shaped rear arch having hinging facilities at its ends, another similar main arch hingedly connected to and supported by the rear arch, a foldable front arch having its front member extend beyond its folding points and its rear members hingedly connected to aforesaid main arch near its top, a foldable intermediate arch hingedly connected to the main arch at approximately the middle of its side arms, the front member of the intermediate arch crossing the rear member of the front arch and being hingedly connected to same at substantially the crossing point, an extension of the front arms of the intermediate arch beyond its folding points provided with a catch, an actuating rod connected at one end to the extension of the front member of the front arch and at its other end to the front member of the intermediate arch above its folding point and below its hinged connection with the front arch, a roof cloth stretched over and secured to all the aforesaid arches, said roof cloth being folded by lifting and pushing the front arch toward the rear thereby releasing the bracing effect of the actuating rod to and between the foldable arches and removing the catch from the rear member of the intermediate arch.

CARL E. E. WOLFERMANN.